US006859703B2

(12) United States Patent
Führer et al.

(10) Patent No.: US 6,859,703 B2
(45) Date of Patent: *Feb. 22, 2005

(54) METHOD AND DEVICE FOR DETECTING A ROUGH ROAD SECTION

(75) Inventors: Jochen Führer, Darmstadt (DE); Ulrich Baiter, Frankfurt (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/324,907

(22) Filed: Dec. 20, 2002

(65) Prior Publication Data

US 2003/0088355 A1 May 8, 2003

Related U.S. Application Data

(62) Division of application No. 09/744,599, filed as application No. PCT/EP99/05437 on Jul. 28, 1999, now Pat. No. 6,532,407.

(30) Foreign Application Priority Data

Jul. 29, 1998 (DE) ......................................... 198 34 141
Jun. 30, 1999 (DE) ......................................... 199 29 838

(51) Int. Cl.[7] ........................ B60G 23/00; B60G 17/01; B60T 8/32; G06F 19/00

(52) U.S. Cl. .......................... 701/38; 303/196; 280/5.5

(58) Field of Search .................. 701/36–38, 45–48, 701/69–75, 78–80, 82–84, 90–91, 93, 65; 303/125, 132, 138, 148, 149–150, 166–173, 176–178, 182–186, 196; 280/5.5, 5.501–5.502, 5.506–5.508, 5.512–5.515, 5.517–5.519

(56) References Cited

U.S. PATENT DOCUMENTS 4,904,016 A * 2/1990 Tatsumi et al. .......... 296/180.5
4,929,034 A * 5/1990 Braschel et al. ............ 303/165

(List continued on next page.)

FOREIGN PATENT DOCUMENTS

DE          36 10 186          10/1987

(List continued on next page.)

OTHER PUBLICATIONS

Hirose et al "Toyota Electronic Modulated Air Suspension System for the 1986 Soarer", IEEE Transactions on Industrial electronics, vol. 35, No. 2, May 1988.*

(List continued on next page.)

*Primary Examiner*—Thu V. Nguyen
(74) *Attorney, Agent, or Firm*—Honigman Miller Schwartz and Cohn LLP

(57) ABSTRACT

A method for detecting a rough road section in a vehicle route comprises the following steps: sensing the acceleration of the vehicle with an acceleration sensor, evaluating the acceleration at several points of time, and detecting the rough road section with regard to the evaluation results. A device for detecting a rough road section in a vehicle route comprises an acceleration sensor for sensing the acceleration of a vehicle, an evaluation device for evaluating the acceleration at several points of time, and a detection device for detecting the rough road section with regard to the evaluation results. A speed control method according to the present invention comprises the following steps: detecting a rough road section, and fixing a nominal speed in response to the detection. A speed control system includes a rough road detection device and a speed controller which controls the speed of the vehicle according to the rough road detection.

11 Claims, 4 Drawing Sheets

U.S. PATENT DOCUMENTS

| | | | |
|---|---|---|---|
| 5,056,354 A | | 10/1991 | Kuwana et al. |
| 5,425,574 A | * | 6/1995 | Sano .......................... 303/177 |
| 5,487,006 A | * | 1/1996 | Kakizaki et al. ............... 701/38 |
| 5,624,164 A | * | 4/1997 | Tozu et al. ................ 303/9.62 |
| 6,052,644 A | * | 4/2000 | Murakami et al. ............ 701/93 |
| 6,058,340 A | | 5/2000 | Uchiyama et al. |
| 6,532,407 B1 | * | 3/2003 | Fuhrer et al. ................. 701/38 |

FOREIGN PATENT DOCUMENTS

| | | | |
|---|---|---|---|
| DE | 43 29 391 | | 3/1995 |
| DE | 195 37 257 | | 4/1996 |
| DE | 195 18 700 | | 11/1996 |
| DE | 196 10 580 | | 9/1997 |
| EP | 0 576 013 | | 12/1993 |
| EP | 0 583 988 | | 2/1994 |
| EP | 0 655 362 | | 5/1995 |
| JP | 02-189236 | * 7/1990 | ........... B60K/31/02 |

OTHER PUBLICATIONS

Search Report of the German Patent Office for Appl. No. 199 33 389.0.

* cited by examiner

METHOD AND DEVICE FOR DETECTING A ROUGH ROAD SECTION

This application is a division of Ser. No. 09/744,599 filed May 8, 2001 now U.S. Pat. No. 6,532,407 which is a 371 of PCT/EP99/05437 filed Jul. 28, 1999.

TECHNICAL FIELD

The present invention generally relates to road condition detection, and more particularly relates to a method and a device for detecting a rough road section.

BACKGROUND OF THE INVENTION

The detection of rough road sections is favorable for speed control systems which operate in the bottom speed range and also off-road, such as the Hill Descent Control System e.g. known from patent application WO 96/11826 PCT/GB95/02298. The purpose of this detection means is to respond when the normal control speed (for example, 10 km/h) is still too high due to the rough road section and should be switched over to a slower speed for safety and comfort reasons.

Previous methods of detecting rough road sections are based on the evaluation of wheel acceleration values sensed by corresponding wheel acceleration sensors. However, these methods are designed for higher speeds and small road bumps and are not appropriate for low speeds and major road surface bumps.

In view of the above, an object of the present invention is to provide a method and a device for detecting a rough road section in a vehicle route which permit reliably detecting a rough road section in the route of a vehicle even in the bottom speed range and/or with an extremely bumpy roadway.

The present invention is based on the fact that rough road detection can be performed on the basis of the acceleration of the vehicle. The acceleration is sensed by an acceleration sensor. The sensor signal sensed is evaluated continuously at several points of time, and the detection of the rough road section is effected on the basis of the result of evaluation.

The term acceleration in this arrangement refers to the longitudinal acceleration ($\ddot{x}$, [m/S$^2$] and/or the rotational acceleration ($\phi$, [S$^2$]) alongside or about the longitudinal, transverse or vertical axis of the automotive vehicle. Preferably, the longitudinal acceleration in the direction of the longitudinal axis and/or the rotational acceleration about the transverse axis is looked at.

The evaluation is preferably started at the point of time when the acceleration has exceeded a defined threshold value. The exceeding of determined threshold values is considered to be due to the existence of bumpy roadways. In the course of the evaluation, a great number of bumpy roadways can be detected which can be counted preferably by a counter. Counting of the counter is preferably continued when the acceleration is above the threshold value for a defined gate time. A rough road section can be identified by the fact that the counter reading reached a defined detection value. To prevent individual roadway bumps from accumulating over a long period of time, another gate time may be provided during which the counter must continue counting or must reach the detection value. If not, the counter will be reset to the start value when the gate time is exceeded.

The method can be adapted to the type of vehicle by a variation of the threshold values and gate times which are used for evaluation purposes and can be fixed in response to speed.

In a speed control method according to the present invention, the nominal speed of the vehicle can be re-established after detection of a rough road section, and the adapted speed can be adapted to the route according to the result of the evaluation.

When a longitudinal acceleration sensor is already provided for the vehicle, the rough-road detection can be realized without additional expenditure in pickups for measuring data.

DETAILED DESCRIPTION OF THE PREFERRED EMBODIMENTS

Figure 1:
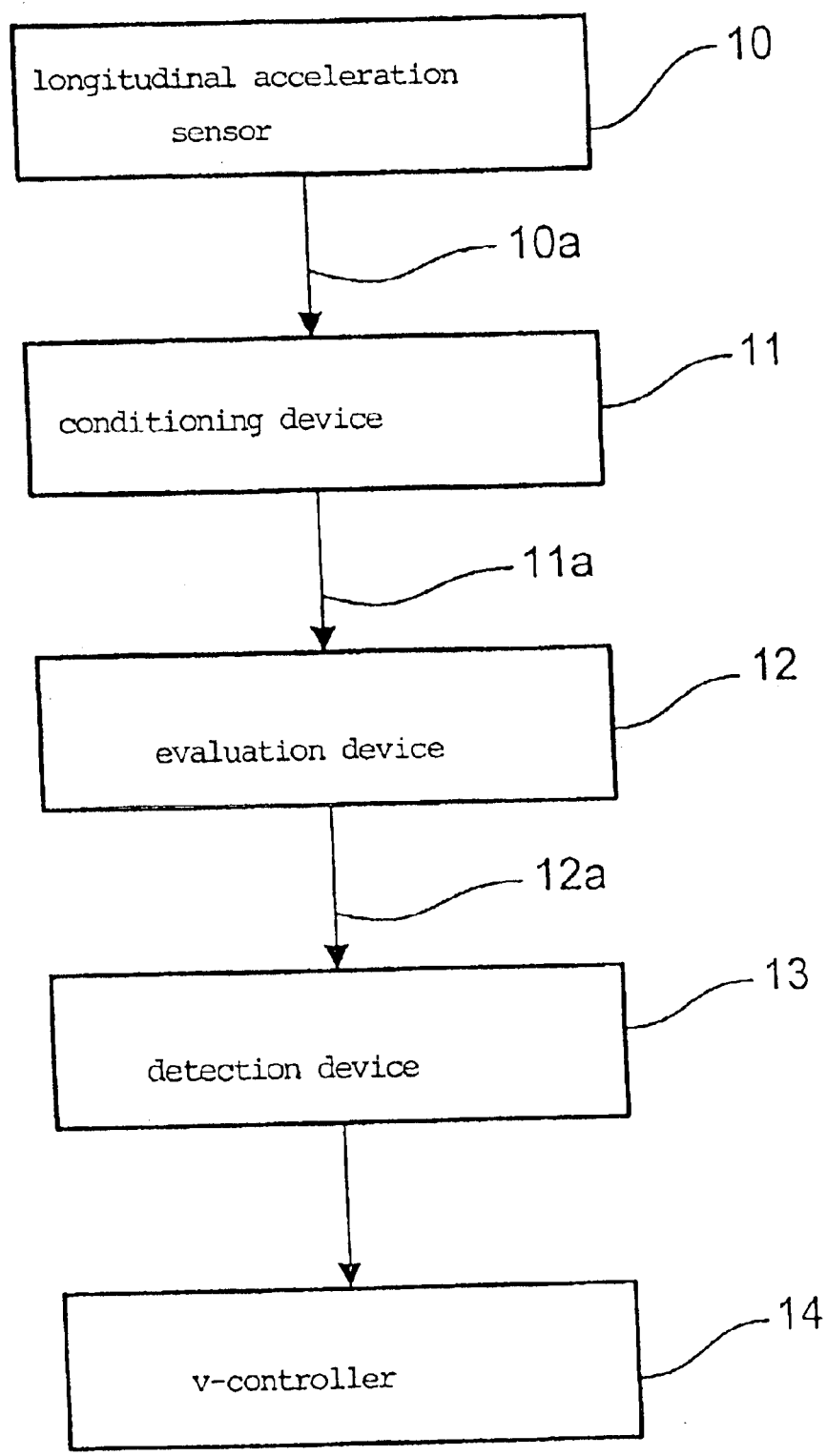
FIG. 1 is a functional block diagram of an embodiment of this invention.

FIG. 1 shows a functional block diagram of a preferred embodiment of this invention. The acceleration is sensed by an acceleration sensor 10, especially a longitudinal acceleration sensor. The sensed sensor signal 10a is transmitted to an optional conditioning device 11 where it is conditioned in conformity with the requirements of the evaluation. Device 11 may be one or more low-pass filters, for example, for eliminating pulse spikes and/or the d-c component. By a differentiation produced from a low-pass filtered and unfiltered signal, the d-c component can be eliminated in approximation which results from the slope of the roadway or a vehicle acceleration. The a-c component is transmitted in the form of the conditioned sensor signal 11a to an evaluation device 12 and can be evaluated therein on the basis of defined criteria, preferably, by way of fixed acceleration threshold values and gate times. Road irregularities, such as bumps, road ditches, or potholes can be detected, and their number and sequence can be recorded. A detection device 13 which is connected downstream of the evaluation device 12 detects the rough road section by way of the evaluation result 12a, preferably, from the number of the roadway irregularities detected. A speed controller 14 will be activated in this case and will re-establish the nominal speed of the vehicle according to the quantity of the evaluation result 12a.

Figure 2:
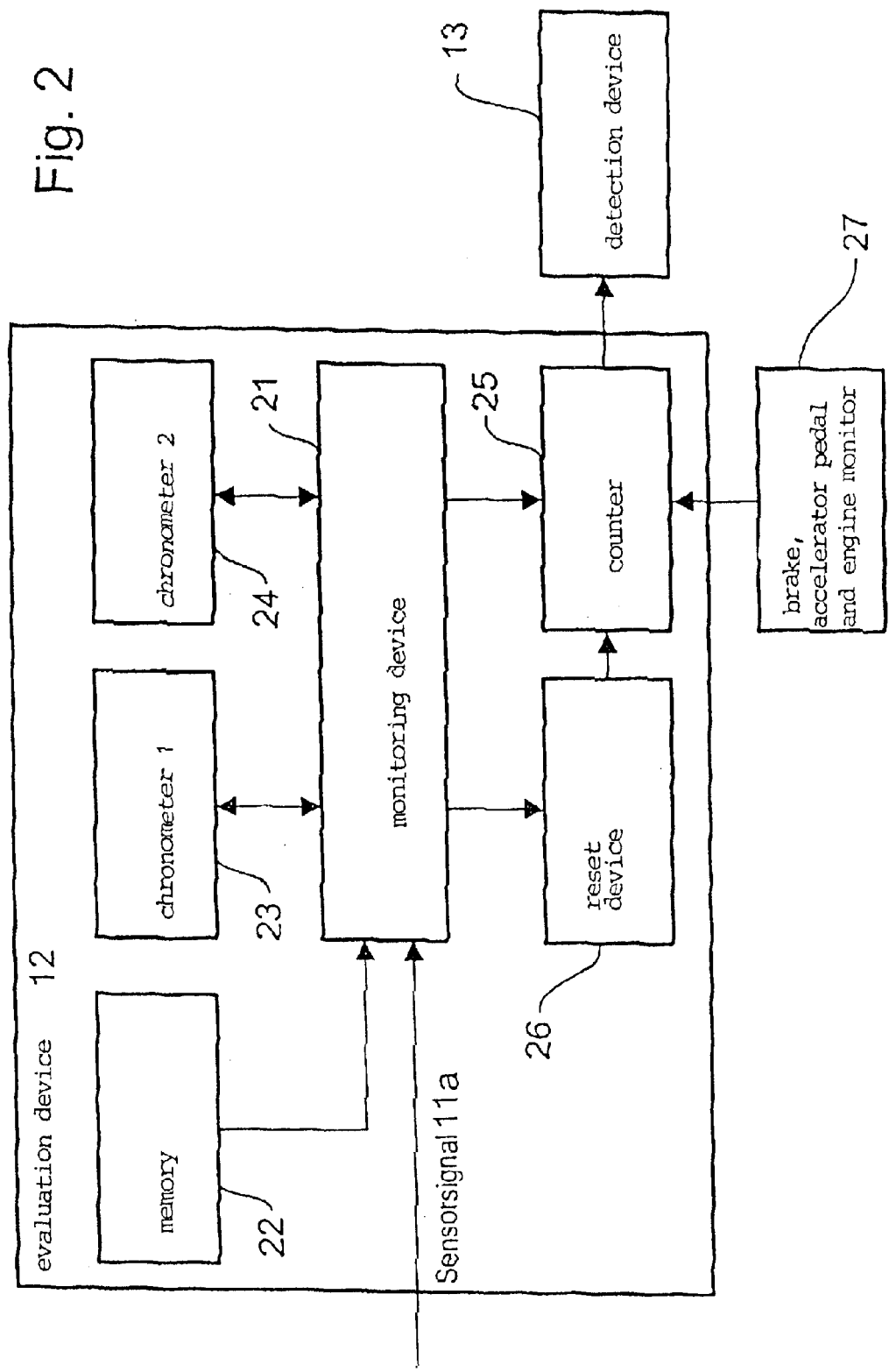
FIG. 2 is an embodiment of the evaluation device of FIG. 1.

FIG. 2 shows an embodiment of the evaluation device 12. The evaluation device 12 may be comprised of a memory 22 for taking up programs and data, a first and a second chronometer designated by reference numerals 23 and 24, a counter 25 for counting acceleration peaks (corresponding to individual roadway irregularities) and a reset device 26. The counter 25 can be connected to a brake monitor, accelerator pedal monitor and engine monitor 27 which will be explained hereinbelow, and to the detection device 13. The rough road section is detected when the counter reading has reached a defined threshold.

The sensor signal 11a which is conditioned, if necessary, is input into a monitoring device 21. The monitoring device 21 examines the sensor signal by way of acceleration threshold values which can be stored in the memory 22. When these threshold values are exceeded, or when values remain under them, the first or the second chronometer will be triggered. In dependence on the time intervals measured by the first chronometer 23, individual roadway irregularities can be detected by the monitoring device 21 when the comparison of the time interval measured by the first chronometer with a gate time stored in the memory shows that the latter gate time was exceeded. The number of the detected bumps can be counted by counter 25. In dependence on the time interval measured by the second chronometer 24, the reset device 26 can be activated by the monitoring device 21 and will reset the counter 25 to the start value, if necessary. To avoid inadvertent activations of the counter caused by acceleration or deceleration of the vehicle, optionally, a brake monitor, accelerator-pedal monitor and engine monitor 27 may be implemented. It can take effect on the counter. The accelerator-pedal and engine monitor 27 will then check whether the engine torque or the accelerator pedal movement are changed by more than a defined amount within a predetermined time. If this is the case, counter 25 is decremented by 1. The same process can be carried out when the brakes are applied or released by the driver. When the counter reading of the counter 25 reaches a defined value, the detection device 13 identifies the vehicle route as a rough road section. It is this way possible to eliminate influences which are not due to the conditions of the route but are e.g. caused by the driving performance of the driver, such as acceleration or deceleration of the vehicle due to opening the throttle or closing it, or due to braking.

Figure 3:
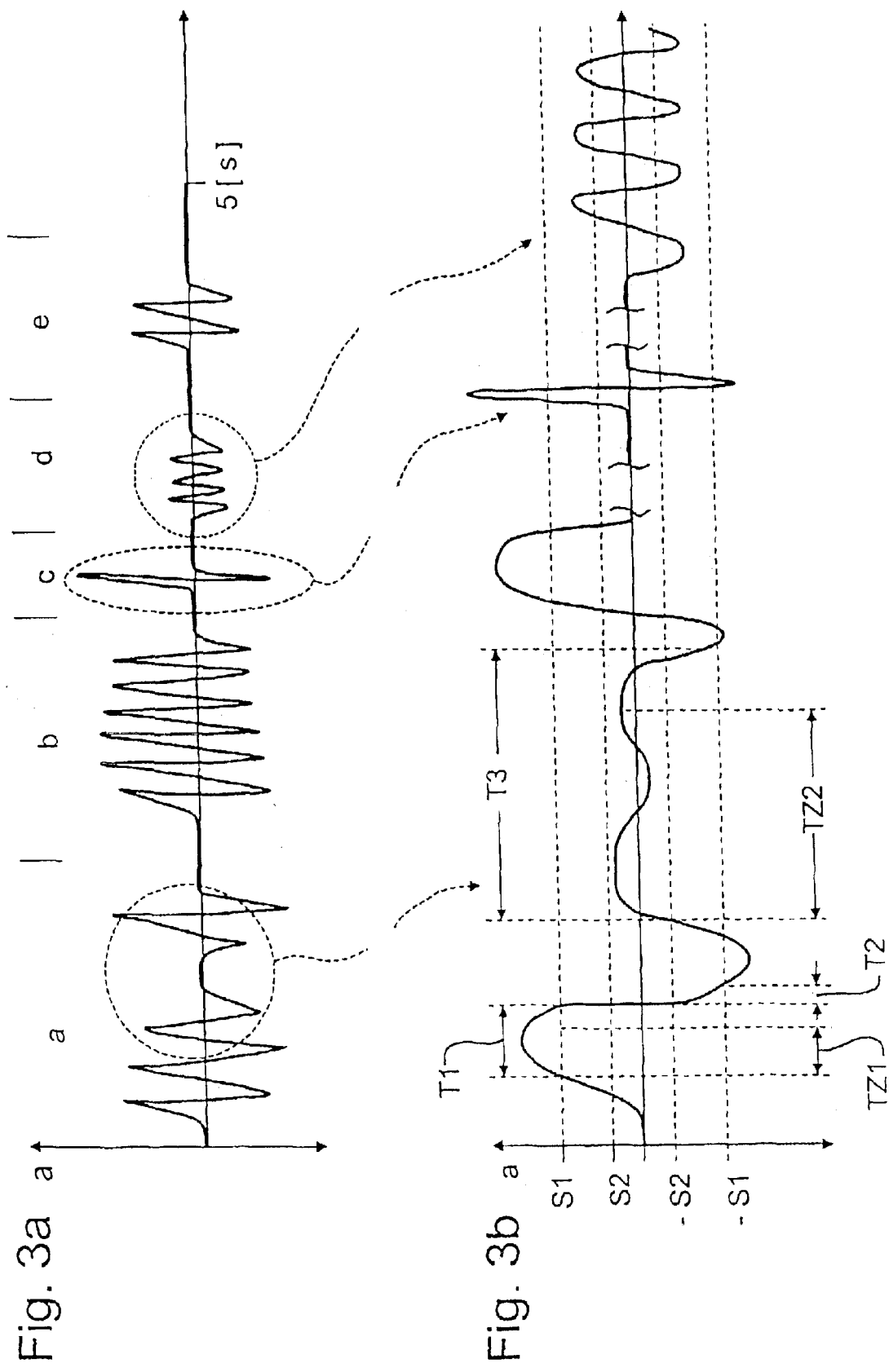
FIG. 3a shows an exemplary signal course.
FIG. 3b shows enlarged details of the signal course of FIG. 3a to explain the evaluation of the signal course.

The quantitative criteria, i.e., threshold values and gate time, by way of which the evaluation device 12 performs the evaluation of the sensor signal 11a and which can be stored in the memory 22 of the evaluation device 12 will be explained in detail hereinbelow by way of FIG. 3. The exemplary course of a conditioned sensor signal 11a is illustrated in FIG. 3a. The signal course recorded may e.g. amount to 5 seconds, for example, at a speed of 5 km/h. FIG. 3b shows enlarged details of the sections a, c, and d from the signal course of FIG. 3a. The evaluation process is started when the acceleration exceeds the threshold value S1 (or falls below the threshold value −S1). Merely the amount of the acceleration can be reviewed for the evaluation. The threshold values S1 and −S1 and, respectively, S2 and −S2 in FIG. 2b differ from each other only in their sign so that the evaluation procedure will be described in the following by way of the positive acceleration values.

The first chronometer 23 is started at the commencement of the evaluation. The time interval is measured then, during which the acceleration signal remains above the threshold value S1 or above a threshold value S3 (not shown in FIG. 3b) which may be lower than the threshold value S1. When this time interval which is referred to as T1 in the example of the first positive half wave of FIG. 3b exceeds the plotted gate time TZ1, a single acceleration peak (corresponding to a bump or a pothole) is detected, and counter 25 is incremented by one unit. When the acceleration signal falls below the threshold value S2 in the further signal course, the second chronometer 24 is started. The time interval which lapses until the threshold S1 is reached again, will be measured with this chronometer. When this time interval exceeds a second gate time TZ2, the counter 27 is reset to the start value.

The time interval T2 plotted exemplarily in FIG. 2b lies below the gate time TZ2, while the time interval T3 is in excess thereof so that the counter is reset during T3. The gate times TZ1 and TZ2 can be fixed depending on the speed of the vehicle and are stored in the memory device 22. The use of the gate time TZ1 prevents an inadvertent triggering of the counter 25 which is caused by pulse spikes of the signal, see e.g. FIG. 3a, section c.

Using the defined gate time TZ2 ensures that a rough road section is only identified when several roadway bumps following each other in brief intervals are detected. If, for example, a counter reading of 7 is necessary to detect a rough road section, only the signal course section b in FIG. 3a leads to the detection of a rough road section. The number of the detected roadway bumps is not sufficient in section e, while in section a, the gate time TZ2 between the detection of the sixth and the seventh roadway bump is exceeded so that the counter is reset before the seventh roadway bump is detected.

Section d shows an exemplary section of the signal course which includes a sufficient number of half waves. However, the amplitudes of the half waves do not exceed the threshold value S1 so that the counter does not count. The rough road detection can be adapted to the vehicle and the roadway conditions by a variation of the threshold values S1, S2, and S3. Therefore, a certain pattern in the course of the acceleration, which corresponds to poor roadway conditions, can be recognized during the evaluation by using the threshold values of the acceleration and the gate times.

Figure 4:
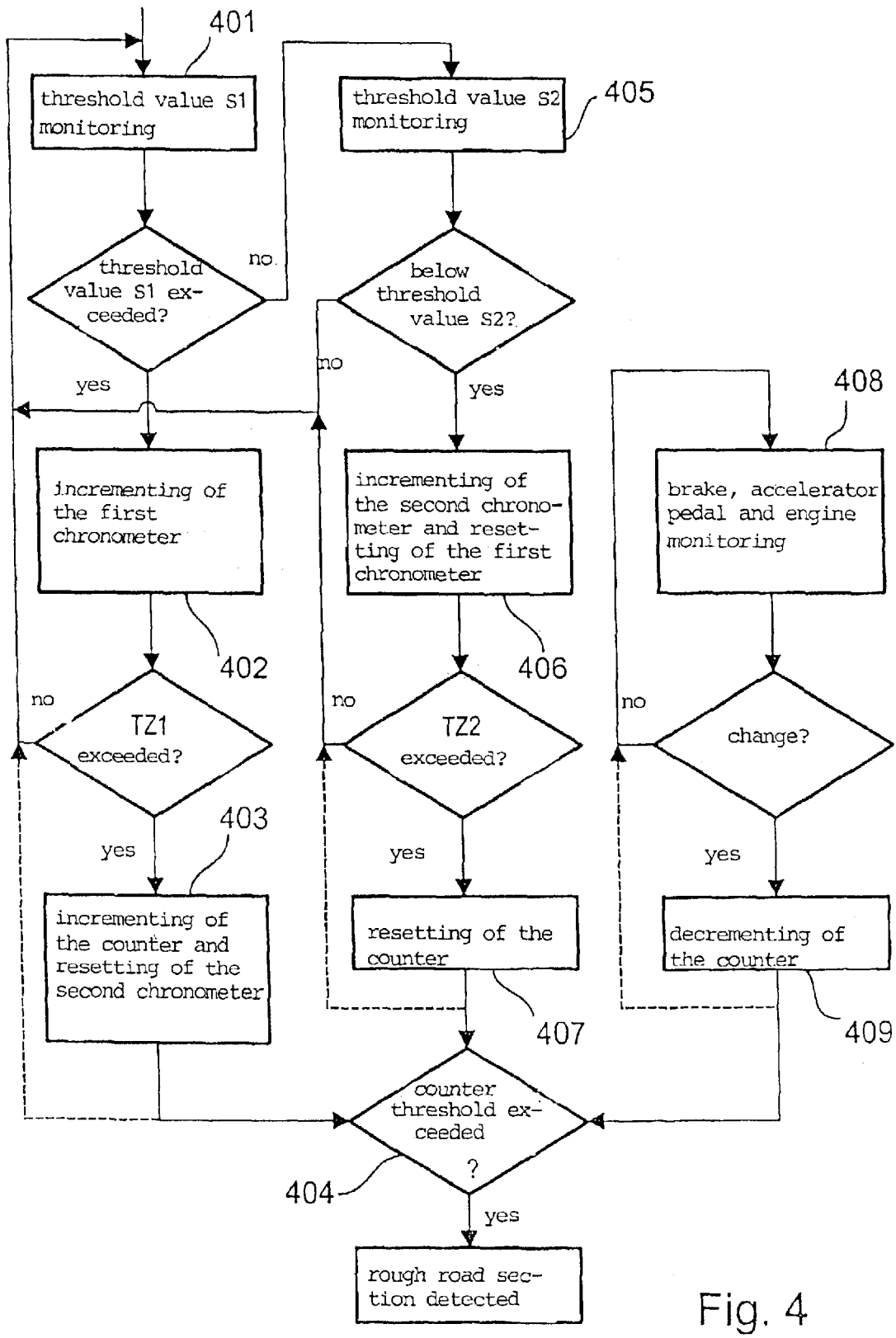
FIG. 4 is a flow chart of the evaluation of the signal course according to the present invention.

An exemplary procedure of the evaluation of the sensor signal 11a in the evaluation device 12 is illustrated in a flow chart in FIG. 4. In step 401, the acceleration signal is monitored continuously or quasi-continuously by the monitoring device 21 as to whether the threshold value S1 was exceeded. If this is the case, the first chronometer 23 is started in step 402. When the time interval measured by the first chronometer 23, during which interval values did not drop below a threshold value S3, exceeds the gate time TZ1, counter 25 is counted upwards in step 403, and the second chronometer is reset. If the time interval measured by the first chronometer does not exceed the gate time TZ1, the routine will return to step 401 without counting. If the counter exceeds a fixed limit value when counting upwards, a rough road section is identified by the detection device 13 in step 404. Irrespective of whether the counter threshold is exceeded, the routine is continued with steps 401, 405, and 408 (dotted lines) to ensure a continuous procedure. If the threshold value S1 is not exceeded in step 401, the acceleration signal is monitored in step 405 as to whether its value falls below threshold value S2, whereupon the second chronometer 24 is started and the first chronometer reset in step 406. If not, the monitoring operation is continued. When the time interval measured by the second chronometer reaches the gate time TZ2, the counter is reset to the start value in step 407, with the result that the procedure returns to step 401. The brake monitor, pedal monitor and engine monitor 27 is continuously examining in step 408 whether the accelerator pedal movement or the engine torque change by more than a defined amount in a predetermined time. When the change exceeds a defined limit value, or when the brakes are applied or released by the driver, the counter is counted backwards by one unit in step 409.

In a speed control, the rough road detection can be used, for example, in order to, change or re-adjust the nominal vehicle speed. It may e.g. be reduced or set to a low value (lower than 15 km/h, lower than 7 km/h).

What is claimed is:
1. Method for detecting a section of rough road, comprising the steps of:
sensing an acceleration of a vehicle;
evaluating the acceleration over a predetermined period of time; and
detecting a section of rough road based on said evaluating step,
wherein said evaluating step comprises determining whether the acceleration is greater than a first threshold value S1, and wherein the section of rough road is detected when a counter reaches a predetermined number of counts, wherein the counter is reset when the acceleration drops below a second threshold value, S2, and does not exceed the first threshold value within a gate time, TZ2.

2. Method as recited in claim 1, wherein the counter continues to count when the acceleration drops below the first threshold value, S1, but exceeds a third threshold value, S3, for a gate time TZ1.

3. Method as recited in claim 1, further comprising the step of removing a d-c component from the acceleration to form a remaining component, and wherein the remaining component is evaluated in detecting the section of rough road.

4. Method as recited in claim 1 wherein the counter counts backwards according to one of an accelerator pedal application, an engine torque, and a brake application.

5. Method as recited in claim 1, further comprising the step of establishing a nominal speed in response to detecting the section of rough road.

6. Method as recited in claim 5, wherein the nominal speed is established according one of an amount of acceleration and an amount of time that has passed since the section of rough road was detected.

7. Device for detecting a section of rough road, comprising:

an acceleration sensor for sensing an acceleration of a vehicle;

an evaluation device for evaluating the acceleration over a predetermined period of time; and a detection device for detecting a section of rough road based on a signal from said evaluation device, further comprising a threshold monitoring device for monitoring whether the acceleration exceeds a first threshold value, S1, and further comprising a counter for counting after the acceleration exceeds the first threshold value, S1, a second chronometer for measuring a time interval in which the acceleration drops below a second threshold value, S2, and further comprising a reset device for resetting the counter to a start value when the acceleration stays below the first threshold value, S1, for a gate time, TZ2.

8. Device according to claim 7, further comprising a first chronometer for measuring a time interval in which the acceleration remains above a third threshold value, S3, for a gate time, TZ1, after exceeding the first threshold value, S1.

9. Device according to claim 7, further comprising a conditioning device for removing a d-c component of the acceleration sensed by the acceleration sensor.

10. Device according to claim 7, further comprising a device for sensing one of an acceleration pedal application, au engine torque, and a brake application.

11. Device according to claim 7, further comprising a speed controller for controlling a speed of the vehicle in response to detecting the section of rough road.

* * * * *

UNITED STATES PATENT AND TRADEMARK OFFICE
CERTIFICATE OF CORRECTION

PATENT NO. : 6,859,703 B2
DATED : February 22, 2005
INVENTOR(S) : Fuhrer et al.

It is certified that error appears in the above-identified patent and that said Letters Patent is hereby corrected as shown below:

Column 5,
Line 16, change "as recited in claim 1 wherein" to -- as recited in claim 1, wherein --.

Column 6,
Line 24, change "au engine torque, and" to -- an engine torque, and --.

Signed and Sealed this

Seventh Day of June, 2005

JON W. DUDAS
*Director of the United States Patent and Trademark Office*